United States Patent [19]

Holland

[11] Patent Number: 4,481,584
[45] Date of Patent: Nov. 6, 1984

[54] HIGHWAY INFORMATION SYSTEM
[76] Inventor: Bobby H. Holland, 501 E. Angela Cir., Goodlettsville, Tenn. 37072
[21] Appl. No.: 288,314
[22] Filed: Jul. 30, 1981
[51] Int. Cl.³ .............................................. G06F 15/50
[52] U.S. Cl. ..................................... 364/424; 364/436
[58] Field of Search ............... 364/424, 444, 449, 450, 364/460, 715; 340/23; 353/12

[56] References Cited

U.S. PATENT DOCUMENTS

| | | | |
|---|---|---|---|
| 3,845,289 | 10/1974 | French | 364/444 |
| 3,925,641 | 12/1975 | Kashio | 364/424 X |
| 4,145,605 | 3/1979 | Marcus | 364/460 X |
| 4,189,779 | 2/1980 | Brautingham | 381/51 |
| 4,190,819 | 2/1980 | Burgyan | 364/449 X |
| 4,301,506 | 11/1981 | Turco | 364/444 X |
| 4,307,859 | 12/1981 | Hayashi et al. | 340/23 X |
| 4,312,577 | 1/1982 | Fitzgerald | 364/424 X |
| 4,367,453 | 1/1983 | Kuno et al. | 364/424 |
| 4,371,934 | 2/1983 | Wahl et al. | 364/444 |

Primary Examiner—Charles E. Atkinson
Assistant Examiner—Gary V. Harkcom
Attorney, Agent, or Firm—J. C. Kesterson

[57] ABSTRACT

A method and apparatus for providing highway information contained in plug-in data cartridges (22) by means of a micro-processor (24) is disclosed. Selected highway information is stored and made available with respect to distance markers such as mile markers or kilometer markers along a roadway from a mass plug-in data cartridge storage media (22) which permanently stores a multitude of data in digital form related to services and other pertinent information available along a selected roadway. Each of this data is indexed according to distance or mile marker indicators along the roadway. Also included is a ROM (read only memory) storage means (28) and a scratch pad memory or RAM (30) for temporarily receiving and storing data. ROM or read only memory (28) contains the control program for controlling the apparatus. The keyboard (14) or input data entry means allows the motorist to provide the necessary input to indicate the selection of highway from which he desires roadway information. Also included is a alpha-numeric character display (16) for providing a visual indication of the desired and pertinent roadway information. Further included is a speech synthesis means (32) for audibilizing the pertinent data information. The complete system is controlled by a micro-processor (24) which itself is controlled by the program contained in read only memory (28). The micro-processor may be any suitable standard micro-processor commercially available.

6 Claims, 8 Drawing Figures

HIGHWAY INFORMATION SYSTEM

DESCRIPTION

1. Technical Field

This invention relates generally to a system for providing information relative to a selected roadway, and more particularly to a system for providing visual and audible information with respect to services such as service stations, food, restaurants, etc. which are proximate a roadway such as for example, an Interstate highway. The information is categorized or indexed and retrieved according to the distant locators or mile markers commonly placed along a roadway.

2. Background Art

The modern Interstate highways provide a great deal to the American citizen's ability to move rapidly from one location to another. However, because of the increased complexity of automobiles, our economic interdependence and our dependence upon credit cards and other forms of credit, and our association and loyalty to specific brands or titles of chain food establishments and service stations, the concept of limited access and discharge from high speed Interstate highways sometimes causes inconvenience and discomfort to the traveler. For example, new highways are often removed far enough from other roads that available restaurants, restrooms, service stations, etc. cannot readily be seen from the highway. Consequently, to determine what types and brands of service stations or restaurant chains are available, one must either depend upon billboards which often are restricted as to their distance to the highways, or leave the roadway on one of its limited off ramps and hope suitable service stations, or food service is available. It is not unusual that a person needing or desiring a particular type of service station or food chain outlet settles for some other product out of fear that the desired product may be many miles away. The traveler then often discovers that if he had only waited for the next off ramp or had continued one more block along a service road or side street, he would have encountered the desired product.

Therefore, it is an object of this invention to provide means for providing information to the highway or roadway traveler with respect to available roadside services which lie ahead of the traveler.

Apparatus adaptable for providing information upon command includes, of course, all types of large scale computers and in some cases small computer devices. Particularly relevant is the Speak and Spell device marketed by Texas Instruments, Inc. of Dallas Tex., which is presently available commercially, which has certain aspects similar to the present invention, and which is disclosed in U.S. Pat. No. 4,189,779 issued to George L. Brantingham on Feb. 19, 1980. This device allows particular keyed alpha-numeric inputs to be compared with internally stored data. The selected inputs may also be synthesized into speech to determine if a selected stored word has been spelled correctly. Thus, although many of the components necessary for the present invention are included in this toy apparatus, the technique of receiving and comparing data is, of course, not the same as the present invention.

It is another object of the present invention to provide complete roadway information to the occupant of a vehicle in both audible and visual form.

DISCLOSURE OF THE INVENTION

Other objects and advantages of the invention will in part be obvious, and will in part appear hereinafter, and will be accomplished by the present invention which provides highway information to the occupant of a roadway vehicle. The methods and apparatus of this invention comprises a highway information system which digitally stores data and information relevant to types of services available at selected locations along a roadway and provides selected portions of the data and information in a recognized human language in response to selected inputs. The apparatus includes a mass storage means for permanently storing a multiplicity of data in digital form. This data includes information relating to services available along a selected highway such as for example types of restaurants, types of motels, types of service stations, and whether or not restroom facilities are available. Elements of the data are contained in a multiplicity of data groups each of which data groups are indexed according to distance indicators such as mile markers along the roadway. An input data entry means such as a keyboard with numerical or alpha-numeric symbols is used for providing input digital signals representative of a selected distance indicator. A speech synthesis means receives and converts the digital data in the temporary storage means into output signals which are representative of the selected data and provides audible vocal sounds representative of the appropriate data in a recognized language. A processing means such as a micro-processor which operates in combination with a RAM (random access memory) and in response to a program contained in a ROM (read only memory) receives the input digital signals, and provides electrical output signals representative of the selected data to a speech synthesis means. The processing means also directs the transfer of a selected data group from the mass storage means to the speech synthesis means in response to the input digital signals and also controls the speech synthesis means. In an alternate embodiment, the apparatus further includes a visual display controlled by the processing means which provides visual symbols, such as alpha-numeric symbols, in a recognized language and representative of the selected data corresponding to the distance locator or mile marker indicator.

BRIEF DECRIPTION OF THE DRAWINGS

The above mentioned features as well as other features of the present invention will be more clearly understood from the consideration of the following description in connection with the accompanying drawings in which:

FIGS. 3A and 3B, which together comprise FIG. 3, are detailed block diagrams of an embodiment of the present invention.

BEST MODE FOR CARRYING OUT THE INVENTION

Figure 1:
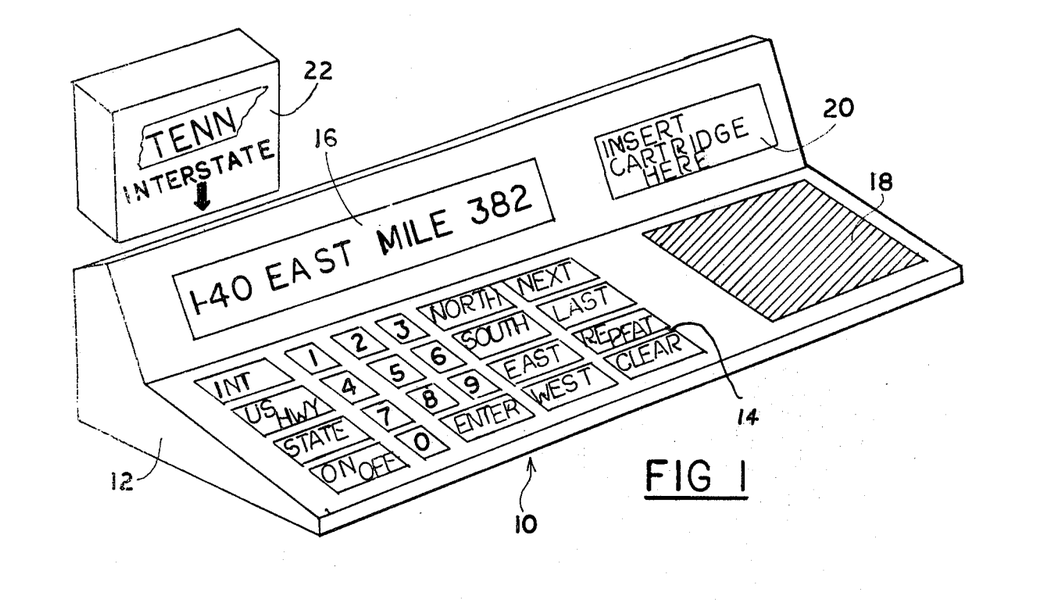
FIG. 1 is a pictorial view representative of the Highway Information System of this invention.

There is shown generally at 10 in FIG. 1 a pictorial illustration of the system of this invention. As shown, the system 10 comprises a container 12 which includes an alpha-numeric input panel 14 and an alpha-numeric character display panel 16. Also included is a speaker 18 and a cartridge receiving slot 20 for receiving data cartridges 22 which contain information (as will be discussed in detail hereinafter) on Interstate highways, State highways, and other major roadways. It will be appreciated, of course, that the container 12 may be installed on the console or center panel of an automobile or may also (on larger and luxury cars) be installed in the front dash panel itself. Thus, as will be discussed in detail hereinafter, particular desired highway information may be retrieved by selectively operating the input panel 14. Once the desired information is requested, it will appear by alpha-numeric characters on the alpha-numerical display panel 16 and will also be received as verbal information from speaker 18.

Figure 2:
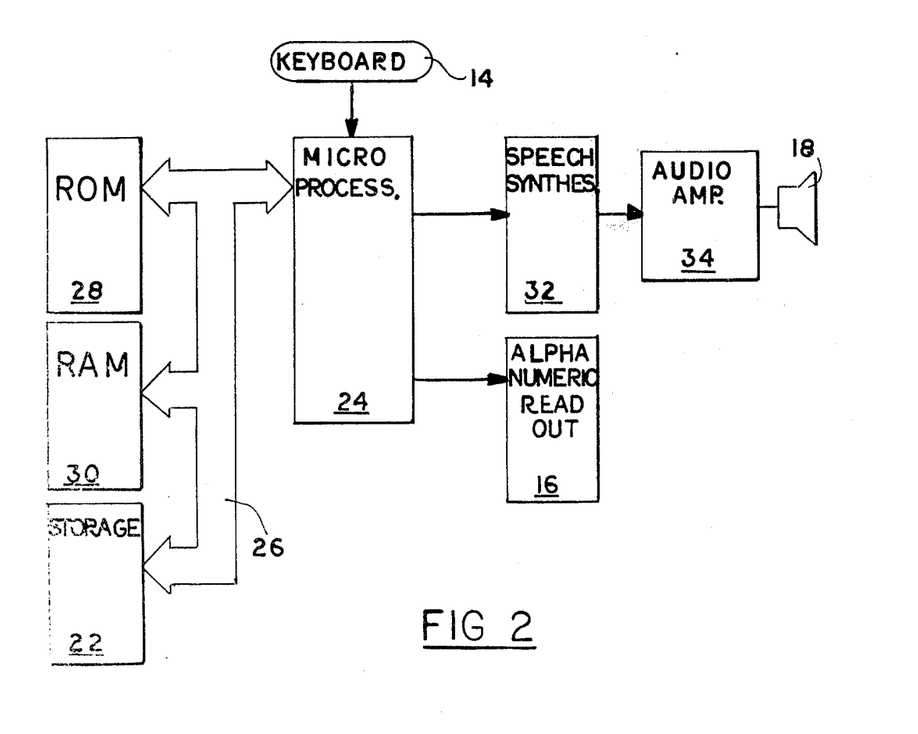
FIG. 2 is a simplified block diagram of a highway roadway information system including the features of this invention.

Referring now to FIG. 2, there is illustrated a simplified block diagram of the major components of the present invention. As shown, the system is controlled by a micro-processor 24 which receives input instructions from keyboard 14 as to the information desired. Since it should be obvious that all of the necessary highway information concerning all highways and Interstates throughout the United States could not readily be contained by a single storage medium, information pertaining to highways of a particular state or alternately a particular Interstate highway which extends through several states is shown as being contained in a cartridge 22 which may be interchanged with other cartridges covering different highways and/or different states. It will, of course, be appreciated that although in FIGS. 1 and 2, it has been indicated that the interchangeable information medium 22 is a plug-in cartridge, it should also be understood that the information medium containing the highway information could be any suitable storage medium such as a tape with a tape drive, a disk with a disk drive and perhaps even the newly developed laser disc system. In addition to the interchangeable information medium 22 which is shown as being connected to micro-processor 24 by means of a parallel conductor bus 26, there is also shown connected a read only memory storage unit 28 and a temporary or scratch pad random access storage unit 30. Those skilled in the art will appreciate that the read only memory 28 would typically hold the necessary system program for controlling micro-processor 24. The temporary storage memory 30 on the other hand would provide random access and temporary storage or scratch pad storage during the operation of the system. The desired information is then preferably provided to the motorist by micro-processor 24 by means of both a verbal or sound output and a visual output. As shown, the sound output is by means of a speech synthesizer 32 which provides an output to an audio amplifier 34 and then to speaker 18 as was discussed heretofore. Similarly, the visual output is by means of the character display panel or alpha-numeric read out 16. Thus, it will be appreciated that during the operation of the system, the appropriate cartridge 22 is inserted into the cartridge receiving compartment 20. The occupant of the automobile then selects information concerning the particular highway, such as for example, whether it is an Interstate, a U.S. highway, or a State highway. The direction, north, south, east, or west is also selected along with the milage indicated by the nearest mile marker. It will, of course, be appreciated that instead of mile markers, the invention would operate equally or well with "kilometer" markers. After receiving this input information, micro-processor 24 will then provide selected information both audibly and visually with respect to the selected mile marker (kilometer marker) input. As will be discussed in detail hereinafter, this information will typically include information concerning lodging data, fuel source data, restaurant data, the next exit ramp, etc.

Figure 3A:
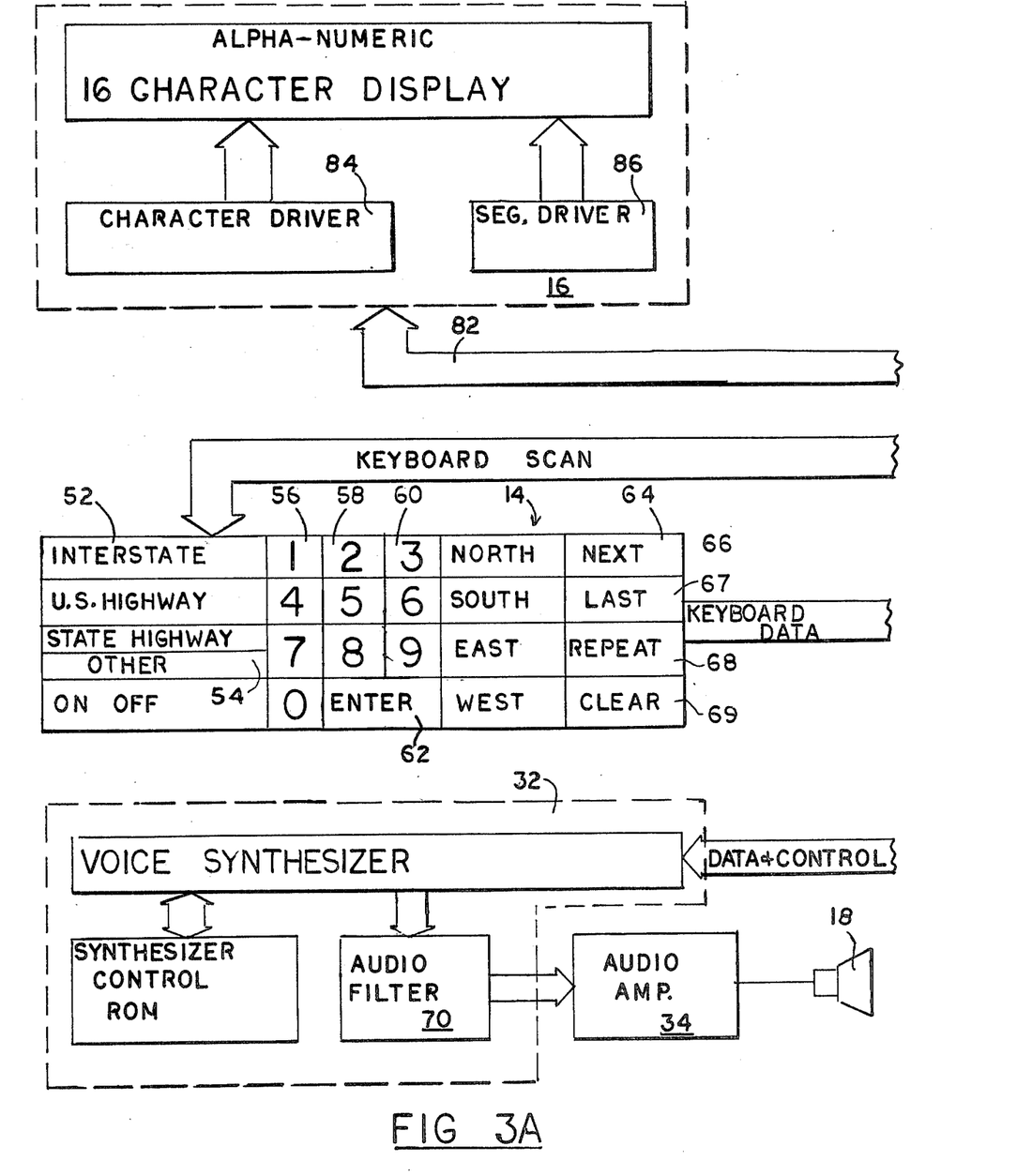
Figure 3B:
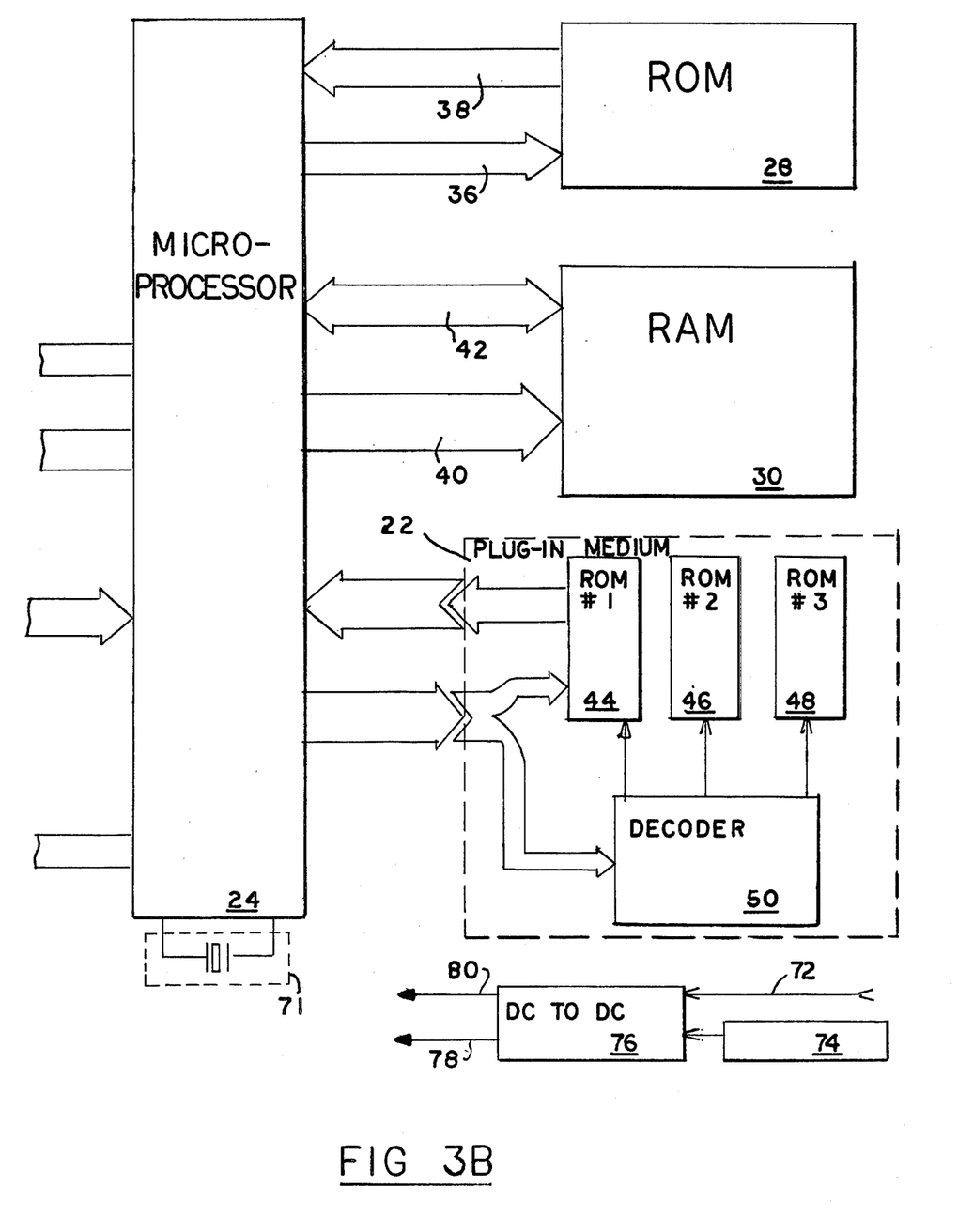
Figure 4A:
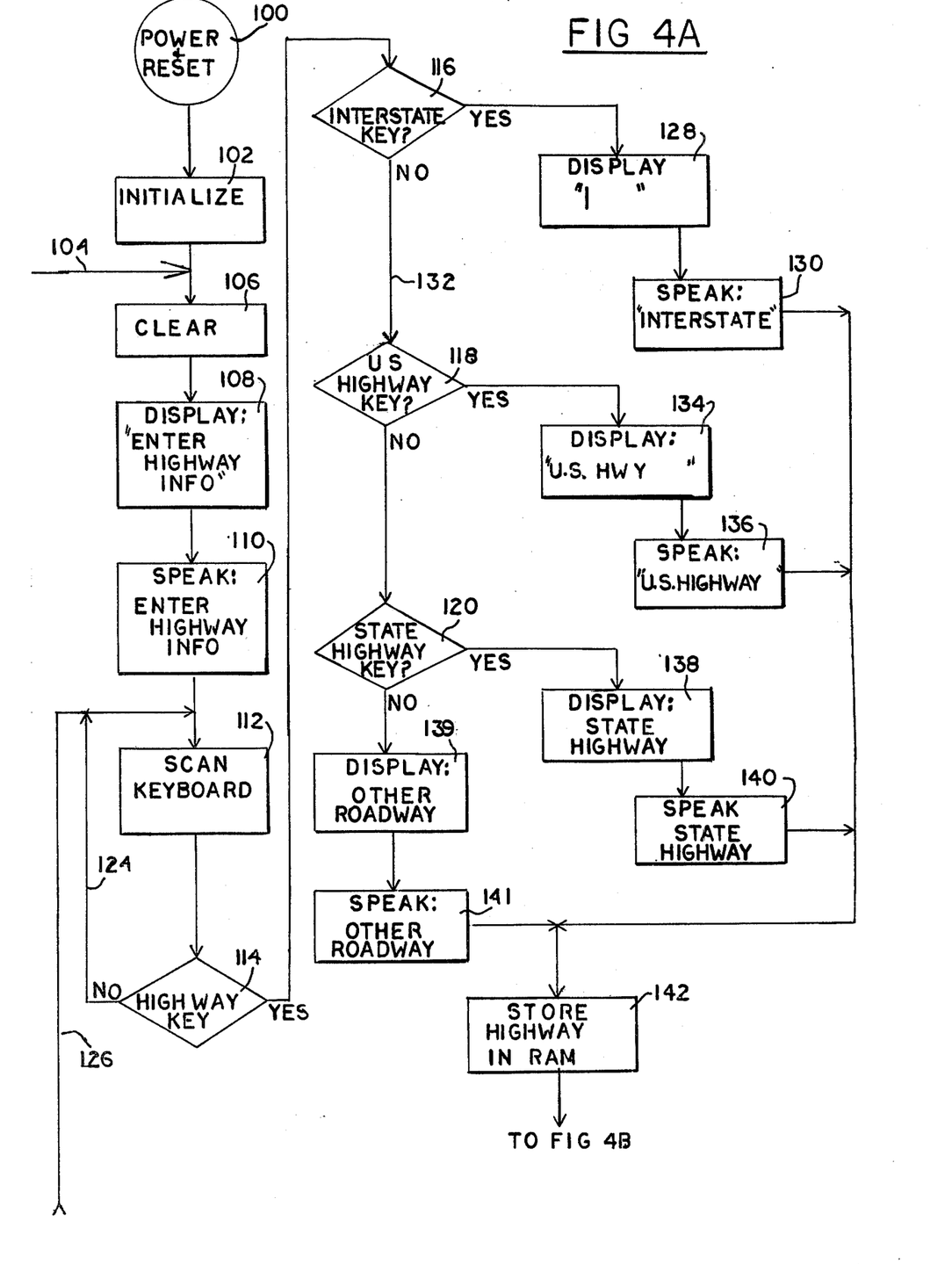
FIGS. 4A through 4D, which together comprise FIG. 4, disclose a program flow chart illustrating the operation of the system of FIG. 3.
Figure 4B:
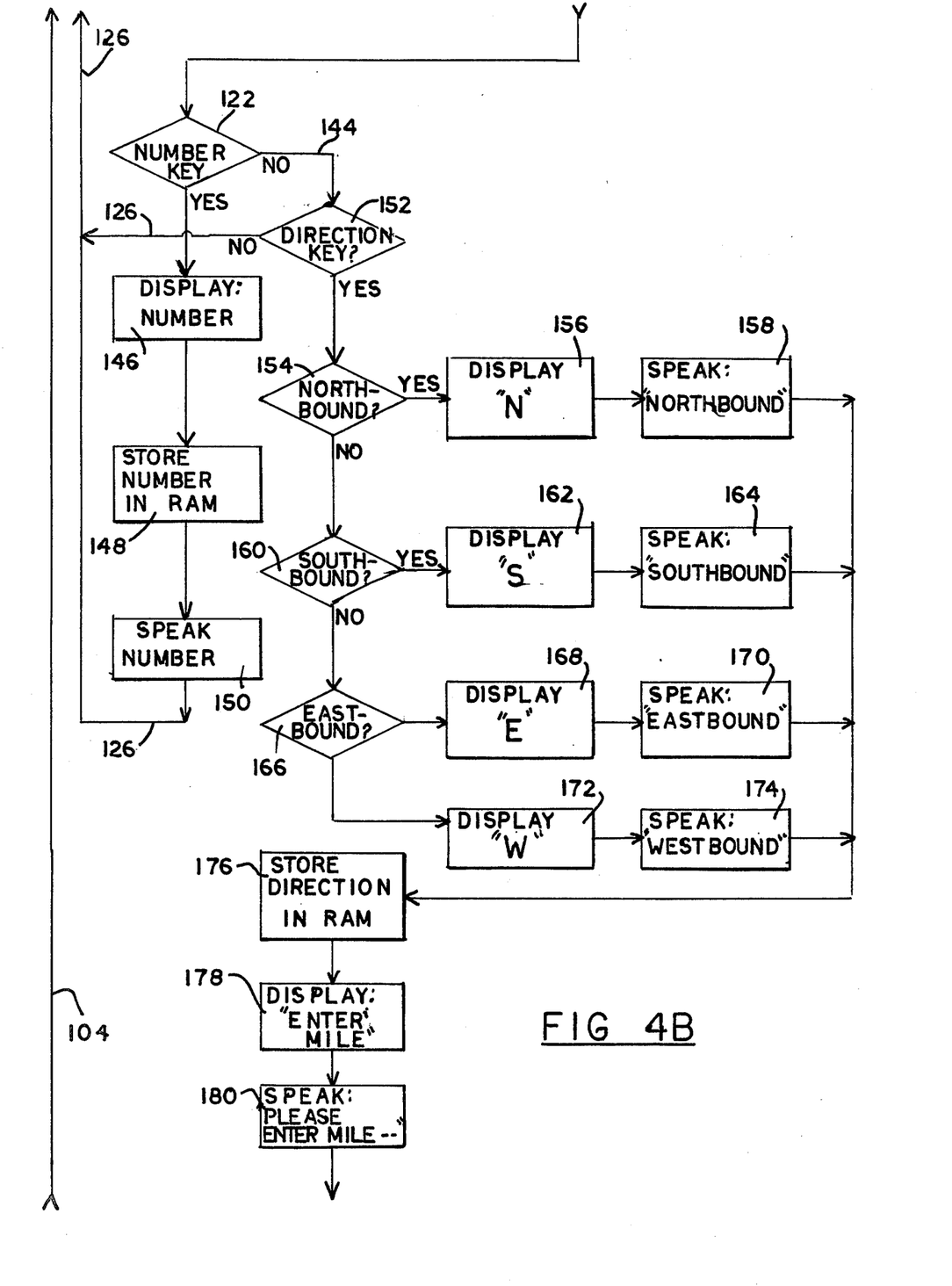
Figure 4C:
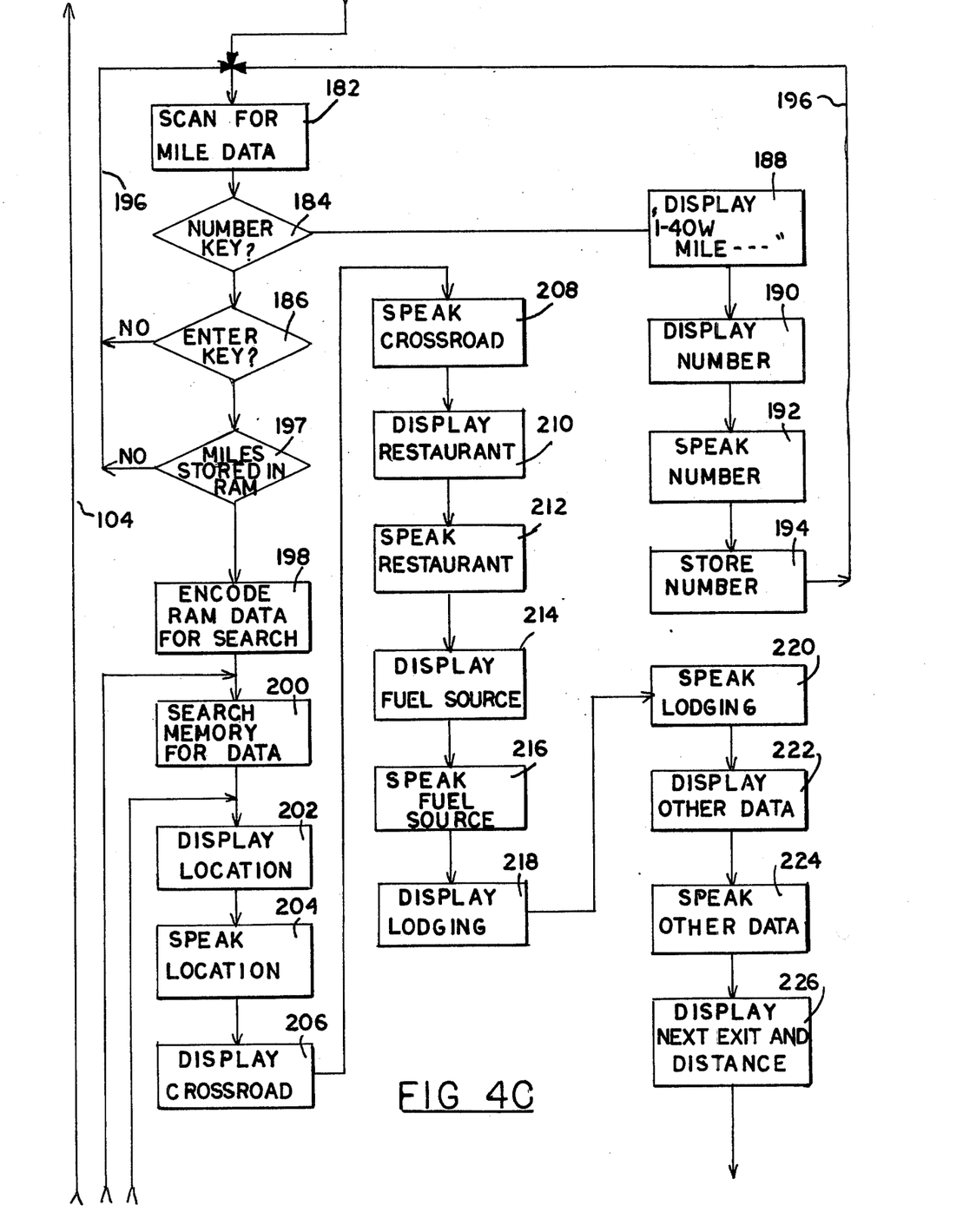
Figure 4D:
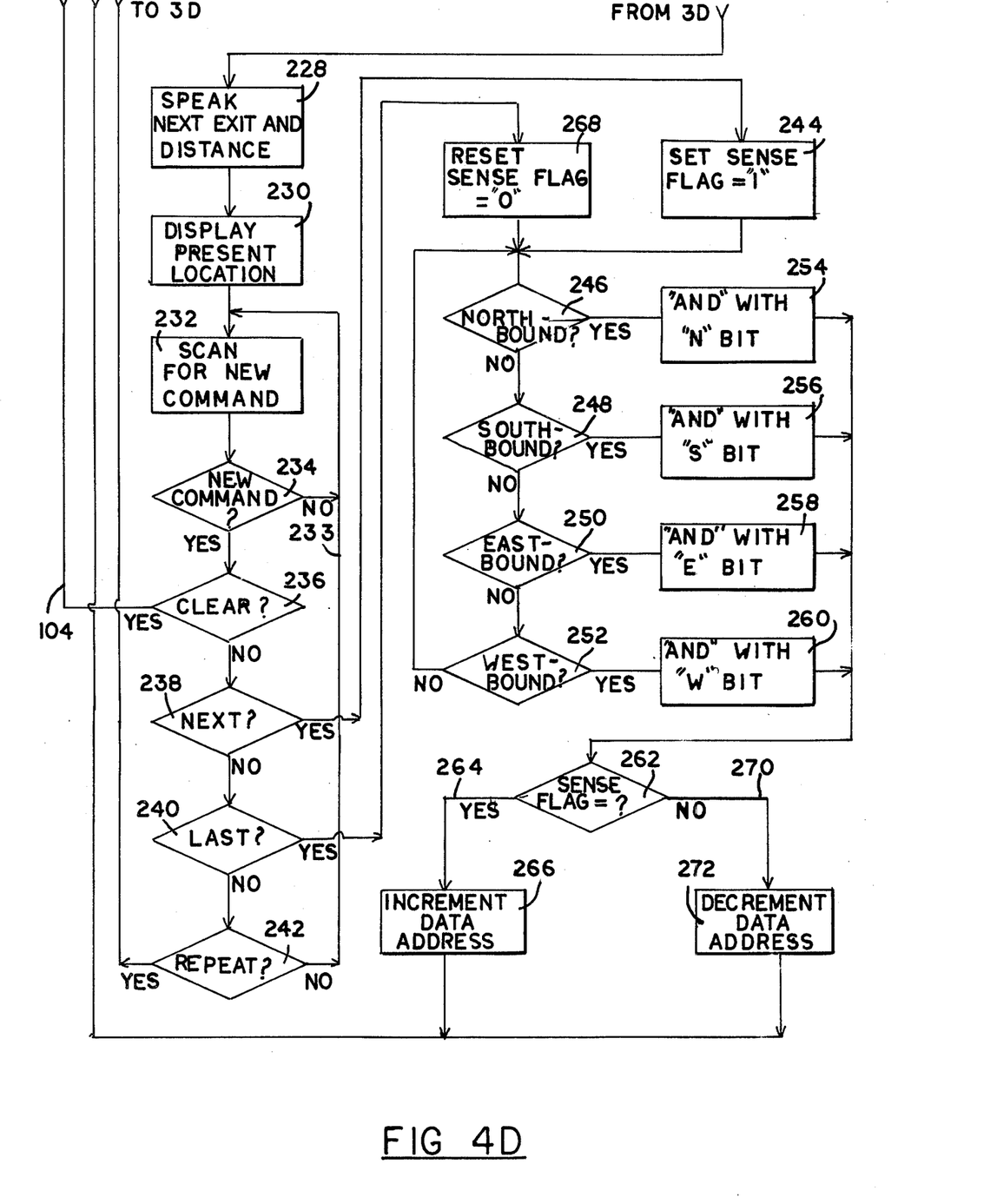

Referring now to FIG. 3, there is shown a detailed block diagram of a preferred embodiment of the system of this invention. Those elements and components which are the same as the elements and components discussed with respect to FIGS. 1 and 2 will carry the same reference numbers in this figure. As shown, and as was discussed with respect to the simplified block diagram of FIG. 2, the highway information system of this invention has at its heart a standard and commercially available micro-processor 24. Although there are a variety of micro-processors which may be suitable for this invention if properly programmed and connected, the micro-processors which are considered to be particularly suitable include such micro-processors as model "8048" by Intel Corporation of Santa Clara, Calif., or Model "1650" made by General Instruments of Hicksville, N.Y. Yet another suitable processor is Model No. 6809 made by the Magnavox Corporation in Phoenix, Ariz. Still, another suitable processor is Model 3870 by the Mostek Corporation of Carrollton, Tex. It will also be appreciated that most micro-processors such as those discussed hereinabove, will typically contain as a built in portion of the micro-processor, its own read only memory which can be suitably programmed for the particular task. However, certain micro-processors are available which do not have built in read only memories and therefore a separate read only memory such as the read only memory shown at 28 must be connected. For those micro-processors which do not include a built in read only memory 28, suitable read only memories are available from Texas Instruments located in Dallas Tex., such as Models 2732, 2716, and 2718. As shown in FIG. 3, micro-processor 24 addresses the read only memory 28 by means of address lines 36 and the program instructions which control the micro-processor for the highway information system of this invention will then be provided on data lines 38. It will also be appreciated, of course, that any micro-processor must necessarily include (either internally or externally) a scratch paid random access memory 30 (which is sometimes called a volatile memory). As shown, the scratch pad memory also includes a pair of address lines 40 and data lines 42. Suitable scratch pad random access memories include a Texas Instruments Model TMS 4027, Dynamic RAM and a Texas Instrument Model TMS 2114 Dynamic RAM. In addition, a Texas Instrument TMS 40L45 Static RAM may also be used. As was mentioned heretofore, the Texas Instrument Corporation is located in Dallas Tex.

As has been discussed heretofore, the purpose of this invention is to be able to store and retrieve upon command highway information data which is pertinent to a particular location mile marker (kilometer marker) along the highway. Therefore, it is of course necessary to include storage means for containing all of the necessary highway information. It will of course be most impractical if not substantially impossible to include in one storage medium all of the highway information related to all of the Interstates, U.S. highways, State highways, etc., in the United States or some other country. Consequently, the present invention includes the capability of exchanging data cartridges or other data mediums which only contain that data within reasonable access to a motorist's present location. To this end, plug-in solid state data cartridges 22 have been determined to be a preferred source of data storage, although as was discussed, it is possible to use with the invention a tape drive with necessary tape cartridges and the like. However, solid state or semi-conductor ROM (read only memory) data cartridges are available which have significant amounts of storage sufficient to contain the necessary highway information data for a particular state or a partiuclar highway Interstate system. As shown, the data cartridge 22 may itself include one or more ROM's such as read only memories 44, 46 and 48. Further, depending upon design choice, a single read only memory chip could be used although the price would be much more excessive. Consequently, it has been found that by simply combining smaller read only memories, sufficient capacity can be obtained at a much more reasonable price. It will be appreciated, of course, that in the event more than one read only memory chip is included in a plug-in data cartridge 22, it will also be necessary to include a read only memory decoder 50 to assure the proper address to the read only memory and the proper data output therefrom. Suitable read only memories for use with this invention include Model 2764 by Texas Instruments located in Dallas Tex., and Model SPR 16,32 or 128 from General Instruments located in Hicksville, N.Y.

Thus, to this point, there has been described a system which includes a micro-processor 24, the necessary control program or instructions contained on a read only memory 28, a volatile scratch pad memory 30 and the plug-in data cartridge 22 containing the necessary highway information data. Of course, the availability of a necessary system program, a micro-processor, and highway data will serve no value unless it can be both properly accessed and used. Thus, as was discussed heretofore the present invention further includes voice synthesizer 32 and a character or alpha-numeric display 16 to be discussed in detail hereinafter for purposes of providing to the motorists the desired highway information. Also as will be appreciated, it is necessary to indicate to the micro-processor just what information is desired by the motorist. Thus, as was discussed heretofore, keyboard 14 comprises a means for giving entry information to the system and for selecting the desired output highway information. In the preferred embodiment of this invention, keyboard 14 includes a selection of keys as follows: the first column indicated by reference number 52 includes a selection of push buttons for Interstates, U.S. highways, State highways, and also an "on" and "off" switch. It might be desirable to include an "other" input button 54 for heavily traveled local roads, toll roads and the like. It is believed that the "on" and "off" switch is self explanatory, however, as will be appreciated, by use of the push buttons, the motorist can select an Interstate highway and in many cases heavily traveled U.S. highways or other State highways and local roads. The next three columns, 56, 58, and 60, include the numerical inputs 1 through 0. Also included, is an "enter" button 62 such that once the proper highway and the proper mile marker numbers have been selected, these selections can be made available for use by the micro-processor 24. It will further be appreciated that all Interstate highways and roads are considered to run in either a north and south direction or an east and west direction. Therefore, for proper operation of this system, if one wishes to know what highway information or what highway services lie some distance down the highway, it is necessary to provide to the system the direction in which the motorist is traveling. Therefore, buttons with the terms north, south, east, and west, are also available to indicate which direction the information is to be scanned by the micro-processor and made available to the motorist. Finally, the last column 64 includes certain control buttons such as the "next" button. For example, the "next" button 66 would be used in the event the motorist has already selected a particular mile marker location, but wants to find out what lies beyond that particular location. Thus, rather than having to punch in all of the additional information the motorist simply pushes the "next" button 66 and the micro-processor will increment one exit and provide information pertaining thereto. Similarly, if the motorist wants to determine the information or the services available at the exit just previous to the one he just considered, he pushes the "last" button 67 and the micro-processor decrements one exit previous to the information just obtained to provide the necessary highway information pertaining to that location. It will further be appreciated that at times the motorist simply may have been listening for restaurant data and failed to hear the pertinent hotel or service station data. Therefore, by simply pushing the "repeat" button 68, the system will again repeat the data just provided. The "clear" button should be self-explanatory in that if an error was made in entering the necessary data, depressing the "clear" button will clear the entry so that a proper or corrected entry may be input into the computer system.

The preferred embodiment of this invention will typically include a voice synthesizer 32 to provide the highway information audibly to the motorist. To those skilled in the art, it will be appreciated that there are voice synthesizers readily available on the market. Typical commercially available voice synthesizers include the "Digitalker" manufactured by National Semiconductor of Santa Clara, Calif. General Instruments of Hicksville, N.Y. also provides a voice synthesizer identified as Model SP-0250, and Texas Instruments Corporation of Dallas, Tex. has available several voice synthesizing units such as the TMS 5200 model or the TMS 5100 model. To those skilled in the art, it will be appreciated that a voice synthesizer itself typically includes its own self contained micro-processor, and consequently most voice synthesizers further include a read only memory contained therewith for providing particular instructions to the voice synthesizer to control the particular speech patterns, word durations, etc. to be provided by the synthesizer. Further, output of a voice synthesizer often has a metallic or unreal sound characteristic. To this end, and to provide a more realistic and human like sound, it is preferable to include an audio filter 70 to convert the digital signals to a more analog form. Finally, as was discussed heretofore, the information may necessarily need to be amplified as indicated by audio amplifier 34 prior to being made available to a speaker 18 such that the information can be received clearly and loudly by the motorist.

It will further be appreciated that in addition to an audible or vocal output, it may also be desirable to include a visual output such as might be presented on a 16 character alpha-numeric display 16. It will, of course, be appreciated that it would not be necessary that each highway information system include both a voice synthesizer for audio output and a alpha-numeric character display for visual output. However, it would be necessary that each system include at least one of these type of information outputs. Although any suitable 16 characteric alpha-numeric display would be suitable for use with this invention, a liquid crystal display available from Epson America, Inc., of Torrance, Calif., and having Model No. MAB 955B is suggested.

It will be appreciated by those skilled in the art that although the internal operation of the display is not a part of this invention, many displays rather than requiring a separate data line for each segment of a character will receive data from the micro-processor on line 82, which is then provided to a character driver 84, and a segment driver 86 to provide the visual read out in a manner well known.

Although all of the above discussed components may be purchased separately from various manufactures, the unique process, or the unique combination of these components disclosed in this invention to produce the unique technique of providing highway information to the traveling motorist has never before been available. In addition to the components discussed, there are also other necessary components of the system, such as a "crystal" or time base 71 which is used by the micro-processor such that necessary timing can be maintained. It will, of course, be appreciated that many microprocessors may include their own crystal time base internally, but in any event some very accurately controlled time base must be available to the micro-processor. Further, the present invention is designed to be used with a motor vehicle such as a car or truck and therefore it can use external power available from the vehicle by connecting to the cigarette lighter or directly to the power system of the vehicle as indicated on line 72. Alternately, of course, the system could use its own internal battery so that the system could be removed from the automobile or vehicle and used indoors at the motel or other locations to plan the trip for the following day. Thus, there is shown an internal battery 74. The external battery power on line 72 or the internal battery 74 would then typically be provided to a DC to DC convertor 76 such that the proper power for the display on line 78 and for the micro-processor and other units on line 80 would be available for running the system. Thus, there has been described to this point what is believed to be a unique highway information system.

It will, however, be appreciated, and as was discussed heretofore, even if all of the necessary highway information was available in the plug-in data cartridge 22 of this system, it would be useless unless the necessary control instructions or control program provided by ROM (read only memory) 28 for controlling micro-processor 24 is available. Therefore, referring now to FIGS. 4A through 4D, there is shown a suitable program or control instructions for controlling the micro-processor 24 and the highway information system of this invention. The controlling program for the highway information system of this invention, as stored in read only memory 28 is automatically initiated upon application of power to the system. Thus, as shown at heading block 100 of FIG. 4, application of power results in the system being reset, and as indicated in block 102, also results in the initialization of all CPU registers, pointers, flags, etc. It will further be appreciated that upon application of the power, the micro-processor 24 will automatically read the program contained in the read only memory 28. Thus, the initialization of the system as indicated by action block 102 will automatically be initiated. It will also be noted that after the initialization as required by action block 102, there is a return branch 104 which will be discussed in detail hereinafter.

After the initialization as indicated by action block 102, the program will then progress to clear the display alpha-numeric character display 16 and clear and reset the voice synthesizer 14 as is indicated in action block 106. After all clearing and initialization, the program as stored in the read only memory will then be advanced to the next action block 108 which will direct the micro-processor to command the alpha-numeric display 16 to display the words "please enter highway info. and direction". Immediately thereafter, and substantially at the same time as far as human perception is concerned, the voice synthesizer will also be commanded to audibilize the words "please enter highway information and direction" as commanded by action block 110. Thus, it will be appreciated at this point the motorist has turned on the system, and the system has now requested that he enter the highway he is traveling upon, and the direction he is heading. It will be appreciated, of course, that the necessary internal commands to display characters on the alpha-numeric will also be provided, but are well understood by those skilled in the art and need not be discussed further herein. Further, it will be appreciated, that any necessary subroutine or commands for directions of the voice synthesizer 32 is typically included as an inherent part of the voice synthesizer, and therefore it is a simple matter for the skilled programmer to simply stipulate to the voice synthesizer 32 which words should be verbalized and then the voice synthesizer automatically selects and provides the audible sounds for such words. After the display and verbalization of the desired words or phrase, the program will then instruct the micro-processor to continuously scan the keyboard for any input data from that source. This is indicated by action block 112 and is accomplished by the logic items illustrated in the diamond shaped logic blocks 114 through 122, and 152 through 156. In the preferred embodiment, continous scanning takes place to determine if an input key has been depressed. To accomplish this, the program instead of scanning each individual key will only determine if any key at all has been depressed as indicated by logic block 114. If no key has been depressed, then it is obvious that at that time no instructions have been entered and the program will simply return to an entry point above action block 112 as indicated by line 124. Also as will be discussed hereinafter, there is a second entry path to block 112 indicated by line 126. However, if a key on keyboard 14 has been depressed as determined by logic item 114, then the program progresses to determine exactly which key on the keyboard has been activated. For example, the determination is made whether an "Interstate" key, a "U.S." key, or a "State" highway key has been depressed. As shown, these interrogations are perfomed by logic blocks 116, 118, and 120. In the event an Interstate key has been depressed, the program then progresses to action blocks 128 and 130 wherein the micro-processor instructs the alpha-numeric display 16 to display the symbol "I- " remaining for the interstate highway number. Subsequent thereto, the microprocessor also commands the voice synthesizer 32 to speak the words "interstate" as indicated by action block 130. However, if the "Interstate" button has not been depressed, then the output from logic block 116 is on the "no" line 132 such that the program proceeds to then determine whether or not the "U.S." highway button has been depressed as indicated by logic block 118. In the same manner as discussed heretofore, if the "U.S." highway button has been depressed, then the visual display is commanded by the micro-processor as indicated by action block 134 to display on the alpha-numeric display 16 the phrase "U.S. Hwy.- ". The space after the system simply indicating that the system is waiting for the number of the highway to be inserted. Also, of course, the program progresses to the next action block wherein the micro-processor is commanded to audiblize the words "U.S. Hwy." as indicated by action block 136. In a similar manner, as was discussed heretofore, if neither the "Interstate" or the "U. S." highway button has been depressed, the program progresses to determine whether a "State" highway button has been depressed as indicated by logic block 120. If such is the case, the micro-processor then requires the words "State Highway" to be displayed on the alpha-numeric display 16 as indicated by action block 138 and the words "State Highway" to be audibilized as indicated by action block 140. Thus, in the event that any one of the "Interstate" highway button, the "U.S." highway button, or the State highway button has been depressed, a corresponding message will be visually displayed on alpha-numeric display 16 and/or will be audiblized by voice synthesizer 32. Regardless of which of the highway system has been choosen, the program will then progress such that the micro-processor 24 will instruct the selected highway data to be stored in the scratch pad RAM (random access memory) 30, as is indicated by action block 142. Upon completion of this task, the program will then progress to determine which highway number is involved. However, prior to proceeding, it would be appreciated that if none of the three buttons, "Interstate" highway, "U.S." highway, or "State" highway buttons was depressed, no display will have taken place, no information will have been audibilized, and consequently no information stored in RAM storage 30. It will be appreciated, however, that the "Key depressed" logic block 114 indicated that a key had been depressed. Therefore, in the example given, if logic block 120 has determined that the "State" highway button had not been depressed, then the "other" button 54 must have been depressed indicating information about some major toll road, local road, or the like as desired. In which case, the other road will be identified both visually and audibly as indicated by action blocks 139 and 141, and the information stored in the scratch pad RAM 30. In any event, the progam will eventually exit from action block 142 and proceed to determine if any number key has been depressed. Assuming now that the selected highway was an "Interstate" highway then it will be appreciated that the term "I- " as indicated in action block 128 will now be displayed on alpha-numeric display 16. The program then continues as indicated by logic block 122 to determine if any number key has been depressed. If a number key on keyboard 14 has not been depressed, the program will proceed along path 144 in a manner to be discussed hereinafter. However, if a number key has been depressed, the program will proceed as follows. If we assume that the interstate highway chosen was interstate I-40, the motorist would appropriately have entered or depressed the number key "4". This number would be displayed as is indicated in action block 146, and stored in scratch pad RAM 30 available for use as is indicated in action block 148. Further, the number "4" would be audibilized by the voice synthesizer 32 as indicated in action block 150. However, it will be recalled that the selected highway was not highway "I-4", but was highway "I-40". Therefore, it will be noted that the output from action block 150 on line 126 returns the program to a point above action block 112. Thus, the program will then again determine if a key has been depressed, and if so, which key(s) have been depressed in a manner discussed heretofore. In the present instance, it will be appreciated that if the motorist desired interstate "I-40", he will have by this time depressed the "I", or the "Interstate" button, the "4" button as well as the "0" button. Therefore, since the program has already recognized that the "Interstate" button and the "4" button has been depressed, it will continue the scan of the keyboard 14 and determine that the type of highway button handled by logic blocks 116, 118, and 120, are no longer in the depressed stage and therefore the program will again progress to block 122 to determine if another number key has been depressed. Since the number "4" key has already been displayed, audibilized, and stored in memory, the program will continue and determine that the number "0" has now been depressed. The number "0" is also stored in RAM 30 as indicated by action block 148, displayed on alpha-numeric display as indicated by action block 146, and audibilized as "zero" as indicated by action block 150. Thus, the program then finds itself on return line 126 to determine if another number is necessary to indicate the desired interstate highway. In this particular instance, we have selected a two digit numbered highway namely, 40, and therefore no other numbers would be desired. However, it would be appreciated, of course, that if a three or four digit number had been necessary to describe the selected highway, then the program path would be repeated one or two more times as necessary to complete the designation of the selected highway. In the present example, since U.S. Highway I-40 was selected it will be appreciated that there is no further number necessary to describe the selected highway. Therefore, upon the program flow, again arriving at logic block 122, the micro-processor will determine that in fact a number key not already processed has been depressed, and therefore the program will proceed along path 144 to determine which direction the motorist is traveling on the highway. This action is indicated by logic block 152 which determines whether any one of the direction buttons, that is, the north, south, east, or west button has been depressed. In the event that one of the direction buttons has not been depressed, the program will then again return on line 126 to the start point of the scan subroutine at a point above action block 112. This scanning cycle will continue of course until the motorist depresses one of the direction buttons. At this point, it would be well to comment that although the program can operate as described to request the necessary information and enter it into the micro-processor for later use, it is also possible to include several small subroutines such that if after a predetermined period of time, a motorist has not entered either a highway number or the direction required for a proper highway selection by means of keyboard 14 the program would request verbally and visually that the particular missing information be supplied. However, in the simplified example of the present invention assuming that the motorist has decided that he is going west bound on highway I-40, the program will then continue as follows: Upon determining by logic block 152 that a direction key has been depressed, the micro-processor 24 will then proceed under program control to determine exactly which key has been depressed. For example, as shown after determining a direction key has been depressed by logic block 152, the program then proceeds to the north bound logic block 154 to determine if the north bound key has been depressed. As mentioned above, in the present case, the direction of travel is westbound, however, if the "North" key was depressed "N" would be displayed after the I-40 number and the words "north bound" audibilized by voice synthesizer 32, as indicated by action blocks 156 and 158. However, in the present example, the north bound key was not depressed but the west bound key. Therefore, the micro-processor will proceed through the program instructions to logic block 160 to determine whether the south bound key has been depressed. Again, in this example, the south key has not been depressed and therefore the "S" will not be displayed and the words "south bound" will not be audibilized as would otherwise be required by action action blocks 162 and 164, respectively. Consequently, the micro-processor will progress according to the program instructions to determine if the east bound key has been depressed, as indicated by logic block 166. Again, this key was not depressed and therefore the "E" will not be displayed, nor will the words "east bound" be audibilized as indicated by action blocks 168 and 170. However, in this case, upon determining that the east bound key has not been depressed, it is not necessary to determine whether the west bound key has been depressed. This is because, the logic block 152 discussed heretofore has already determine that at least one of the four direction keys has been depressed. Therefore, if neither the north bound key, the south bound key, nor the east bound key was depressed then the west bound key must have been depressed. Thus, in the present situation, once it has been determined by block 166 that the east bound key was not depressed, the program will then proceed to display the "W" beside the I-40 and audibilize the words "West Bound" as indicated by block 172 and 174, respectively. This information is also stored in the scratch pad RAM 30 as indicated by action block 176. The micro-processor is then instructed by the program in RAM 30 by action block 178 to display a request that the motorist enter the appropriate mile marker as indicated by the words "enter mile" on alpha-numeric display 16. The RAM program then commands the voice synthesizer 32 to also speak the phrase "please enter mile number, then press enter" as indicated by action block 180. At this point, the micro-processor is then commanded by the program contained in read only memory 28 to continuously scan the keyboard for the desired mile marker input data as is indicated by heading block 182. As shown, the program determines whether the "enter" key or any one of the number keys (zero through nine) have been depressed as indicated by logic blocks 184 and 186. If neither the "enter" key 62 or a number key has been depressed, the micro-processor simply recycles to a point above heading block 182 and repeats the scan over and over again until the enter key or a number key is depressed. In the event a number key has been depressed, the program then redisplays on alpha-numeric display 16 the highway type, number, the direction of travel, and the word "mile" as indicated by action block 188. In the present example, it will be appreciated that the alpha-numeric character display 16 will include thereon the indication of I-40 West (I-40 W) followed by the word "mile" and a space left for the entry of the mile marker number. The program then proceeds to display the first number depressed as indicated by action block 190, and to audibilize the number as indicated by action block 192. If in our present example, we assume that we enter mile marker 286, the number 2 would have been depressed and therefore the number 2 would be added to the alpha-numeric display 16 after the word mile. Subsequent thereto, the number 2 would be audibilized as indicated by action block 192. This "2" would then also be stored as a number in the scratch pad RAM 30 as indicated by block 194. As indicated on line 196, the program then returns to the heading block 182 as discussed heretofore. Again, if we assume that the number of mile marker is 286, the motorist will have also depressed the "8" and the "6". Therefore, the program will then determine that these two numbers have been depressed (block 184), and therefore the program will continue to display and speak the numbers "8" and "6" in sequence. Of course, the complete number 286 will now also be stored in the scratch pad RAM 34 as indicated by block 194. Finally, the motorist after entering the number 286 will enter or depress the "enter" key 62. Thus, after storing "6" of the number 286 in scratch pad RAM 30, the program returns by means of path 196 to the heading block 182. Upon testing whether another number has been depressed as indicated by logic block 184, the micro-processor will determine that no further number has been depressed and will therefore follow the "no" output branch to logic block 186 to determine whether the "enter" key 62 has been depressed. In this situation, if we assume that the motorist paused momentarily after entering the number 286, but before pressing the enter key, the micro-processor will again return to the heading block 182 and continuously recycle through logic block 186 until the motorist does depress the "enter" key 62. Once the motorist depresses the "enter" key 62 logic block 186 will recognize this and direct the micro-processor to proceed to the next logic block 197 which determines if a number has been stored in scratch pad RAM 30. If not, the program returns to a point in the program above heading block 182. However, if a mile marker number has been stored, the program directs the micro-processor to "encode the scratch pad RAM data in to the address key for a data search" as is indicated by action block 198. The next instruction as indicated by action block 200 is to search memory for the data corresponding to the selected mile marker. Thus, at this point, the micro-processor proceeds to search the data available in the plug-in data cartridge 22 and retrieve all information available with respect to Interstate highway I-40 west bound and at highway mile marker 286. Once this information is retrieved by micro-processor 24 from the plug-in data cartridge 22, information concerning specific aspects of location such as the name of the nearest town is displayed by alpha-numeric display 16 as indicated by block 202, these names of the towns will also be spoken or audibilized as indicated by block 204. This information will be allowed to remain in the display and will be repeated by the voice synthesizer a selected number of times as can be determined by a skilled programmer. Other important information such as the crossroad with respect to this mile marker is also then displayed and audibilized as indicated by blocks 206 and 208. This information is then followed by pertinent restaurant data such as, for example, whether or not a "McDonald's", a "Shoneys", or other restaurant is available at that particular mile marker exit location. This information is displayed and audibilized as indicated by blocks 210 and 212. The restaurant data is then followed by a display and audibilization of the fuel source data such as which type of service stations are availble. Such as an example, Texaco, Gulf, Amoco, or any other major or minor independent oil service station. This action is accomplished as indicated by action blocks 214 and 216. This fuel source data is then typically followed by data concerning what lodging is available such as Holiday Inn, Ramada, Howard Johnson, etc., and this information is both displayed and audibilized as indicated by blocks 218 and 220. For many situations, the above information will be all that is included in a particular crossroad. However, depending upon the conditions, other pertinent data may be indicated and desirable and will be displayed and audibilized as indicated by control blocks 222 and 224. After the "other pertinent data" has been displayed and audibilized, data concerning the next exit number, and distance from the mile marker number entered by the material is then displayed and audibilized as indicated by action blocks 226 and 228. After this is completed, to again inform the motorist of his present location, the current location is then again provided as indicated by action block 230 so that the motorist can determine the distance still to travel if he chooses a later exit number. At this point, there has been described the typical operation of retrieving, displaying, and audibilizing highway information system in the unique manner provided and disclosed by the present invention. However, it will be appreciated that in a typical situation, more than one use or request would be expected. Therefore, after the desired information has been completed the program in the read only memory 28 then commands the microprocessor 24 to scan the keyboard for a new command as indicated by action block 232. At this point, the micro-processor scans the keyboard to determine if any of the command keys such as the "next", "last", "repeat", or "clear" command keys have been depressed. If none of these keys has been depressed, the program returns to the heading block 232 by means of path 233 and continues to recycle until such a key is depressed. This is indicated by the logic block 234. However, in the event one of the several command keys has been depressed, the program will then proceed to determine which key was depressed. For example, as shown and indicated by action block 236, the program will first determine whether the "clear" key has been depressed. If the clear key has been depressed, the program then returns to the beginning of the program at a point above action block 106. Thus, the display is cleared and the voice synthesizer set to silence. The "please enter highway information" is then displayed and audibilized as indicated by blocks 108 and 110.

However, if the "clear" display key has not been depressed, the program will proceed to instruct the micro-processor to determine if the "next" key has been depressed as indicated by logic block 238. Assuming for the moment that the "next" key has not been depressed, the program then progresses to determine whether the "last" key has been depressed as indicated by logic block 240. In the event either the "next" or "last" key has been depressed, further action is required, and this will be discussed hereinafter. However, assuming that neither the "next" or "last" key has been depressed, then the program continues to block 242 to determine whether the "repeat" key has been depressed. In the event the "repeat" key has been depressed, the program returns to the action block 202 to again repeat the "location", "crossroad", "restaurant data", "fuel source data", "lodging data", etc. Thus, it will be appreciated that in the event the motorist fails to comprehend certain of the data provided earlier, this data may be repeated as often as necessary until the motorist is satisfied that he understands exactly what highway services are available. Of course, in the event the "repeat" key is not depressed, micro-processor 24 will then be directed by the program in RAM 30 to return to a point in the program above action block 232. This process will be continued until one of the other command keys are depressed. Thus, it will be appreciated that the response of the micro-processor to selecting any of the command keys other than the "next" or "last" keys has been discussed. It will be appreciated, that the motorist will often realize that he is not satisfied with the services available at the selected mile marker and therefore would like to determine what services might be available at the next exit of the Interstate. Or perhaps, the motorist did not like what he heard with respect to the selected marker and decides maybe he should stop one exit earlier or even return to an exit which he has already passed. In that event, the motorist will simply select either the "next" or the "last" command button. Assuming for the moment that the motorist selects the "next" key, the micro-processor will determine this at logic block 238, and then under directions of the program will proceed to set a sense flag or bit which will be used to increment or decrement the program to a new mile marker location. This is indicated by action block 244. For purposes of example only, we will assume that the sense flag is set to a "1" position by the 244 block. After this action is completed, the program then determines which direction has been given, i.e. north bound, south bound, east bound, or west bound as indicated by blocks 246, 248, 250, and 252. As indicated, no matter which one of these directions has been selected, the same set bit or the "1" is "anded" with the direction bit, as indicated by control blocks 254, 256, 258, and 260. Thus, in the present situation, a "1" is "anded" with whatever direction bit existed. This result is then tested to determine the "sense flag" by logic block 262. If the sense flag is a "1" as indicated by the setting of action block 244, then the output will be a "yes" as indicated on path 264 and the microprocessor will then be directed by the program stored in read only memory 28 to increment the data file address one position as indicated by block 266. Upon completion of this incrementation, the program is then returned to a point above heading block 200 to again search the data memory for the mile data file selected. The program then proceeds again to display and audibilize the highway information pertinent to that particular mile marker. The program will then follow the same flow path as was discussed heretofore and then again eventually arrive to determine whether a command "next" or "last" has been depressed. If however we assume that instead of the "next" command having been depressed previously, the "last" command was depressed, the program will proceed to the action block 268 instead of action block 244 and set the sense flag to a "0". The program then follows the same action as was discussed heretofore and eventually the "0" bit is "anded" with the direction and the result compared at logic block 262. In this particular instance, however, the "0" will result in a "no" answer output of logic block 262 on path 270 such that the data file address will be decremented one location as indicated by action block 272. Again, the program returns to a point above action block 200 to again search the file. The program will then display the information pertinent to the mile marker address which will be one location previous to the one originally searched and displayed. At this point, the program will then again continue to scan the keyboard for a new command unless the system is either turned off or a new command is provided.

Thus, there has been to this point described the unique apparatus providing highway information for the motorist along with a program contained in a read only memory suitable for controlling the apparatus. It is respectfully submitted however that although the present invention has been described with respect to specific methods and apparatus for providing a highway information system, it is not intended that such specific references be considered limitations upon the scope of this invention except as is set forth in the following claims.

I claim:

1. An operator controlled highway information system for storing data and information related to the types of services available at selected locations along a roadway, and for providing portions of said data and information related to specific ones of said locations in a recognizable human language as selected by said operator, and in response to distance indicator input data provided by said operator, comprising:

a selected mass storage means for permanently storing data in digital form relating to services available along a selected roadway, elements of said data being contained in a multiplicity of data groups, each of said data groups indexed according to distance indicators along said roadway, and each of said data groups being accessible according to said distance indicators;

input data entry keyboard for providing selectable data as input digital signals by said operator, said input digital signals including selected ones of roadway designation signals initiated by roadway designation keys for selecting a designated roadway, direction of travel signals initiated by directional keys for selecting which direction the permanently stored data is to be scanned, distance indication signals initiated by numerical keys for selecting a designated roadway location, and special control signals initiated by control keys for causing said system to repeat the previous system response or for causing said system to sequentially scan the permanently stored data in a designated direction;

a random access digital storage means for repeatedly receiving and temporarily storing selected and varied data;

a read only memory for permanently storing in digital form controlling data, said controlling data including an instructional program for controlling said system, and for providing interaction between said operator and said system to solicit input information from said operator, such interaction from said operator to said system by means of said input data keyboard, and from said system to said operator by means of a speech synthesizing means as determined by a processing means;

speech synthesizing means for receiving and converting digital data, including selected portions of said instructional program stored in said read only memory, and selected ones of said multiplicity of data groups, into output signals representative of said received digital data for providing audible or vocal sound representations of such data in a recognizable language; and processing means for receiving and evaluating said input digital signals, controlling the transfer of said varied data to and from said random access storage means, and the transfer of said selected ones of said controlling data and said multiplicity of data groups to said speech synthesizing means and controlling said speech synthesizing means, said processing means operating in response to said input digital signals and said instructional program.

2. The apparatus of claim 1 and further including a visual display means controlled by said processing means, said visual display means converting and displaying selected ones of said controlling data and said multiplicity of said data groups as visible symbols representative of said recognizable language.

3. The apparatus of claims 2 or 1 wherein said processing means include means for determining those data groups indexed as being within a selected range of said indicator input data.

4. The apparatus of claim 1 wherein said mass storage means comprises a plurality of commercially available mass storage means combined as a single mass storage means and wherein the multitude of data of each one of said plurality relates to a different selection of roadways.

5. The apparatus of claims 2, 1 or 4 wherein said mass storage means includes a semi-conductor mass storage means.

6. A method of selectivity providing roadway data from a highway information system to a human operator or driver, said roadway data representative of types of services available at selected locations along a roadway and providing portions of said data and said information related to specific ones of said locations as selected by said operator in a recognizable human language, and in response to selected distance indicator input data provided by said operator, comprising the steps of:

permanently storing in digital format, data representative of available services along said roadway, in a selected mass storage means, elements of said data contained in a multiplicity of data groups, each of said data groups indexed according to distance indicators along said roadway, and each of said data groups being accessible according to said distance indicators;

repeatedly receiving and temporarily storing selected and varied data in a random access storage means;

permanently storing, in a read only memory, controlling data in digital form including an instructional program for controlling said system, and for providing interaction between said operator and said system to solicit input information from said operator;

controlling the transfer of said varied data to and from said random access means, and selected ones of said multiplicity of data groups from said mass storage means to a speech synthesizing means in response to digital input signals and said instructional program said controlling being implemented by a processing means;

communicationg from said operator to said system by means of a system input data keyboard by providing operator selected data as said digital input signals, said digital input signals including selected ones of roadway designation signals initiated by roadway designation keys for selecting a designated roadway, direction of travel signals inititated by directional keys for selecting which direction the permanently stored data is to be scanned, mileage indication signals initiated by numerical keys for selecting a designated roadway location, and special control signals initiated by control keys for causing said system to repeat the previous system response or for causing said system to sequentially scan the permanently stored data in a designated direction;

communicating from said system to said operator by said speech synthesizing means by synthesizing speech in response to electrical output signals representative of data contained in selected ones of said multiplicity of data groups and said instructional program to selectively convey roadway information corresponding to said distance indicators in an audible and recognizable language.

* * * * *